US008677017B2

(12) United States Patent
Xu et al.

(10) Patent No.: US 8,677,017 B2
(45) Date of Patent: Mar. 18, 2014

(54) DETERMINING LOCATION INFORMATION FOR A NODE IN A NETWORK USING AT LEAST ONE LOCAL LANDMARK NODE

(75) Inventors: Zhichen Xu, San Jose, CA (US); Sujata Banerjee, Sunnyvale, CA (US); Sung-Ju Lee, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2680 days.

(21) Appl. No.: 10/767,075

(22) Filed: Jan. 30, 2004

(65) Prior Publication Data
US 2005/0168380 A1  Aug. 4, 2005

(51) Int. Cl.
*G06F 15/173* (2006.01)
*G06F 15/177* (2006.01)

(52) U.S. Cl.
USPC ............................ 709/242; 709/220; 709/222

(58) Field of Classification Search
USPC ................... 709/238–243, 220, 222
See application file for complete search history.

(56) References Cited

U.S. PATENT DOCUMENTS

| 4,823,111 | A | 4/1989 | Tsuchiya et al. | |
|---|---|---|---|---|
| 6,845,084 | B2 * | 1/2005 | Rangnekar et al. | 370/254 |
| 6,937,569 | B1 * | 8/2005 | Sarkar et al. | 370/238 |
| 6,947,754 | B2 * | 9/2005 | Ogasawara | 455/456.3 |
| 6,954,435 | B2 * | 10/2005 | Billhartz et al. | 370/252 |
| 6,980,524 | B1 * | 12/2005 | Lu et al. | 370/254 |
| 7,266,085 | B2 * | 9/2007 | Stine | 370/252 |
| 2001/0034793 | A1 * | 10/2001 | Madruga et al. | 709/238 |
| 2001/0055976 | A1 | 12/2001 | Crouch et al. | |
| 2002/0078188 | A1 * | 6/2002 | Anand et al. | 709/222 |
| 2004/0109417 | A1 * | 6/2004 | Castro et al. | 370/238 |
| 2005/0060406 | A1 * | 3/2005 | Zhang et al. | 709/225 |
| 2005/0090242 | A1 * | 4/2005 | Kotzin et al. | 455/422.1 |

OTHER PUBLICATIONS

Xu et al. Building Topology-Aware Overlays using Global Soft-State. Oct. 11, 2002. http://www.hpl.hp.com/techreports/2002/HPL-2002-281.html.*
Pei et al., LANMAR: landmark routing for large scale wireless ad hoc networks with group mobility, 2000.*
Tsuchiya, The landmark hierarchy: a new hierarchy for routing in very large networks, 1988.*
Gerla et al., ILandmark routing for large ad hoc wereless networks, 2000.*
Calvert, K. et al., "Modeling Internet Topology", IEEE Communications Magazine, vol. 35, No. 6, p. 160-163, Jun. 1997.
Castro, M. et al., "Scribe: A Large-Scale and Decentralized Application-Level Multi-Cast Infrastructure", IEEE Journal on Selected Areas in Communications, vol. 20, No. 8, p. 1489-1499, Oct. 2002.
Chen, B. et al., "L + : Scalable Landmark Routing and Address Lookup for Multi-Hop Wireless Networks", MIT LCS, Tech, Mar. 2002.
Chu, Y. et al., "A Case for End System Multicast", IEEE Journal on Selected Areas in Communications, vol. 20, No. 8, p. 1456-1471, Oct. 2002.

(Continued)

Primary Examiner — Hieu Hoang

(57) ABSTRACT

Location information for a node in a network is determined. A first distance from the node to at least one global landmark node is determined and a second distance from the node to at least one local landmark node proximally located to the node is determined. Location information for the node based on the first distance and the second distance is generated.

25 Claims, 8 Drawing Sheets

(56) References Cited

OTHER PUBLICATIONS

Duan, Z. et al., "Service Overlay Networks: SLAs, QoS and Bandwidth Provisioning", ICNP, Nov. 2002, p. 334-343.
Francis, P. et al., "IDMaps: A Global Internet Host Distance Estimation Service", IEEE/ACM Transactions on Networking, vol. 9, No. 5, p. 525-540, Oct. 2001.
Fu, X. et al., "CANS: Composable, Adaptive Network Services Infrastructure", USITS, San Francisco, CA, Mar. 2001.
Gummadi, K.P. et al., "King: Estimating Latency Between Arbitrary Internet End Hosts", IMW, France, Nov. 2002, p. 5-18.
Ng, T.S.E. et al., "Predicting Internet Network Distance With Coordinates-Based Approaches", IEEE INFOCOM, NY, Jun. 2002.
Pei, G. et al., "LANMAR: Landmark Routing for Large Scale Wireless Ad Hoc Networks with Group Mobility", MobiHoc, Boston, MA, Aug. 2000, p. 11-18.
Ratnasamy, S. et al., "Topologically-Aware Overlay Construction and Server Selection", IEEE INFOCOM, NY, Jun. 2002.
Theilmann, W. et al., "Dynamic Distance Maps of the Internet", IEEE INFOCOM, Tel Aviv, Isreal, Mar. 2000, p. 275-284.
Tsuchiya, P.F., "The Landmark Hierarchy: A New Hierarchy for Routing in Very Large Networks", SIGCOMM, Stanford, CA, Aug. 1988, p. 35-42.
Xu, D. et al., "Finding Service Paths in a Media Service Proxy Network", MMCN, San Jose, CA, Jan. 2002.
Zhao, B.Y. et al., "Brocade: Landmark Routing on Overlay Networks", IPTPS 2002, Cambridge, MA, Mar. 2002.
Zhuang, S.Q. et al., "Bayeux: An Architecture for Scalable and Fault-Tolerant Wide-Area Data Dissemination", NOSSDAV, Port Jefferson, NY, Jun. 2001.
Banerjee S et al—'Service Adaptive Multicast for Media Distribution Networks"—Proc of IEEE Workshop—WIAPP 2003—Jun. 2003 pp. 50-60.
Xu Zhichen et al—"Building Topology-Aware Overlays Using Global Soft-State"—Proc of Int'l Conference on Distributed Computing Systems—May 2003—pp. 500-508.

* cited by examiner

DETERMINING LOCATION INFORMATION FOR A NODE IN A NETWORK USING AT LEAST ONE LOCAL LANDMARK NODE

TECHNICAL FIELD

This invention relates generally to networks. More particularly, the invention relates to determining location information for a node in a network.

BACKGROUND

The Internet, as it has grown considerably in size and popularity, is being used to provide various services and applications to users. Diverse applications, such as streaming a short movie demonstrating how to assemble a piece of furniture, taking a virtual tour of a real estate property or a scenic spot, watching a live performance of an artist, and participating in a networked multi-user computer game or conference, are all available to users via the Internet.

An important trend is that users are no longer satisfied with receiving services that are targeted at mass audiences. Users are demanding services that are tailored to their individual needs. With the proliferation of personalized services, an important challenge facing future network infrastructure is balancing the tradeoffs between providing individualized services to each user and making efficient use of network resources.

A fundamental challenge in effectively utilizing network resources and services is efficiently and quickly locating desired resources/services in large networks, such as the Internet. For example, a user may generate a query for finding particular media content available in the network. Location and distance estimation techniques may be used to find the closest cache or proxy in the network that provides the desired data or service, such as the desired media content.

Landmark clustering is a known location and distance estimation technique for determining a distance to a node in a network. Landmark clustering was introduced for routing in large networks. A node's physical location in a network is estimated by determining the node's distance to a common set of landmark nodes in the network. Landmark clustering assumes that if two nodes have similar distances (e.g., measured latencies) to the landmark nodes, the two nodes are likely to be close to each other. Routers store the estimated physical locations of the nodes and use the position information for routing to the closest node.

FIG. 8 illustrates estimating physical locations for the nodes 810 and 820 in the network 800 using landmark clustering. The client nodes 810 and 820 determine their distances to the landmark nodes L801 and L802. Because the nodes 810 and 820 have similar distances to the landmark nodes L801 and L802, the nodes 810 and 820 are determined to be close to each other.

Landmark clustering is an efficient technique for determining general locations for nodes in a network. However, current landmark clustering techniques tend to result in false clustering, where nodes that are far away in network distance are clustered near each other. That is nodes that are far away from landmark nodes tend be estimated as having locations near each other when in fact they are located at substantial distances from each other. Secondly, landmark clustering is a coarse-grained approximation and is not effective in differentiating between nodes that are relatively close in distance.

SUMMARY OF THE EMBODIMENTS OF THE INVENTION

According to an embodiment, a method of determining location information for a node in a network includes determining a first distance from the node to at least one global landmark node and determining a second distance from the node to at least one local landmark node. The local landmark node may be proximally located to the node. The method also includes determining location information for the node based on the first distance and the second distance.

According to another embodiment, a node in a network includes means for determining a first distance from the node to at least one global landmark node and means for determining a second distance from the node to at least one local landmark node. The local landmark node may be proximally located to the node and the at least one global landmark node. The node also includes means for determining location information for the node based on the first distance and the second distance.

According to yet another embodiment, a computer system is operable to connect to a peer-to-peer network. The computer system includes a processor operable to determine a physical location of the computer system in the peer-to-peer network by determining distances to at least one global landmark node and at least one local landmark node. The local landmark may be proximally located to the computer system in the peer-to-peer network. The computer system may also include a memory operable to store location information associated with the physical location for the computer system.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF THE EMBODIMENTS

Figure 1:
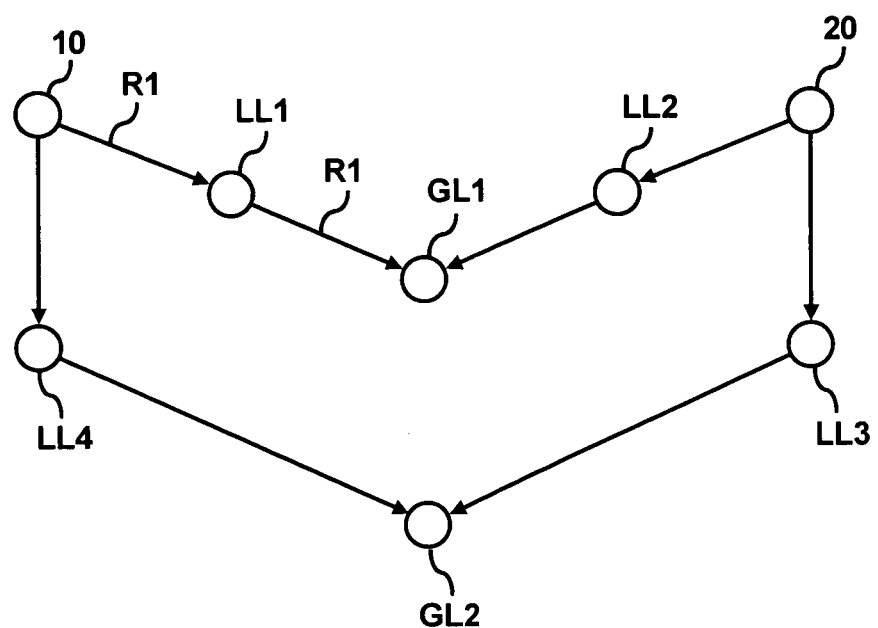
FIG. 1 illustrates using global landmark nodes and local landmark nodes in a network to generate location information according to an embodiment.

For simplicity and illustrative purposes, the principles of the embodiments are described. However, one of ordinary skill in the art would readily recognize that the same principles are equally applicable to, and can be implemented in, all types of network systems, and that any such variations do not depart from the true spirit and scope of the embodiments of the invention. Moreover, in the following detailed description, references are made to the accompanying figures, which illustrate specific embodiments. Electrical, mechanical, logical and structural changes may be made to the embodiments without departing from the spirit and scope of the embodiments of the invention.

According to an embodiment, an enhanced landmark clustering technique is used to estimate physical locations of nodes in a network. A node is any device that may send and/or receive messages from another device via the network. A physical location of a node, also referred to herein as the node's location in the network, is the node's location in the network relative to other nodes in the network. For example, location information for the node may be determined by measuring distances to other nodes in the network, such as global landmark nodes and local landmark nodes that are proximally located to the node. The location information may be used as an estimation of the node's physical location in the network. Distance to a node, for example, may be measured using a network metric such as round-trip-time or network hops. Distances between nodes and location information for nodes may not be the same as geographical distances between nodes and geographical locations of the nodes, because distances are measured in terms of a network metric, such as round-trip-time or network hops, and are not measured in terms of a geographical distance metric, such as kilometers or miles.

Global landmark nodes and local landmark nodes may be randomly selected from the nodes in a network. Almost any node in the network may be selected to be a global landmark node or a local landmark node. The number of nodes selected to be local landmark nodes and global landmark nodes is generally much smaller than the total number of nodes in the network. Also, the total number of global landmark nodes in the network is generally smaller than the number of local landmark nodes. The number of global and local landmark nodes used in the network may depend on the desired accuracy of the location information. To minimize network traffic local landmark nodes may be strategically placed in the network, such as near gateway routers. For example, routers encountered by a message from the node en route to a global landmark can be used as local landmark nodes.

As described above, location information for a node may be determined by measuring distances to global landmark nodes and local landmark nodes that are proximally located to the node. In one embodiment, the node measures distances to each of the global landmark nodes and the proximally located local landmark nodes in the network to determine the node's location information. In one example, a proximally located local landmark mark node is generally closer to the node than at least one of the global landmark nodes. For example, a local landmark node may be on a routing path between the node and a global landmark node. In this example, the distance to the local landmark nodes can be obtained with little or no added messaging overhead if these local landmark nodes can respond to measurement traffic, such as a probe packet for measuring round-trip-time. That is additional distance measurement traffic to the local landmark nodes need not be generated, because this example may utilize a probe packet being transmitted to a global landmark node to measure distances to local landmark nodes encountered en route to the global landmark node. In another example, a local landmark node may be proximally located to a node if the local landmark node is within a predetermined distance to the node. In this example, a node may identify local landmark nodes in proximity to the node using a global information table, and then measure distances to the identified local landmark nodes. Thus, local landmark nodes, which may not be on a routing path to a global landmark node but which may still be useful for accurately determining location information for the node, can be used.

Location information may be generated for substantially all the nodes in a network. The location information may be used for a variety of applications. For example, the location information may be used to identify a node for routing in the network. In another example, the location information may be used to find a closest node providing desired content or services for a user.

Compared with conventional landmark clustering techniques, the landmark technique according to embodiments of the invention a physical location of a node can be accurately estimated by determining distances to a relatively small number of global and local landmark nodes. Also, the local landmark nodes provide accurate information of the local network characteristics. Thus, optimal paths for routing based on local network characteristics may be selected.

FIG. 1 illustrates an example of using global landmark nodes and local landmark nodes in a network to generate location information. Location information is generated for nodes 10 and 20 in the network 100 by measuring distance to global landmark nodes and local landmark nodes in proximity to the nodes 10 and 20. For example, for node 10 distances are measured to the global landmarks GL1 and GL2. Distances are also measured to the local landmark nodes LL1 and LL2. Distance to a node may be measured using a known network metric, such as round-trip-time (RTT) or network hops. For example, the node 10 may transmit a probe packet to the global landmark node GL1 and measure RTT of the probe packet to determine the distance to the global landmark node GL1. A probe packet, for example, is a packet generated by node to measure one or more predetermined network metrics, such as RTT.

A landmark vector representing the location information for the node 10 is generated including the distances to the global landmark nodes GL1 and GL2 and the local landmark nodes LL1 and LL4. The landmark vector for the node 10 may be represented as <d(n, GL1), d(n, LL1), d(n, GL2), d(n, LL4)>, where d is the distance between the nodes and n represents the node for which location information is being generated.

Similarly, location information may be generated for the node 20. For example, distances are measured to the global landmarks GL1 and GL2. Distances are also measured to the local landmark nodes LL2 and LL3. A landmark vector representing the location information for the node 20 is generated including the distances to the global landmark nodes GL1 and GL2 and the local landmark nodes LL2 and LL3. The landmark vector for the node 20 may be represented as <d(n, GL1), d(n, LL2), d(n, GL2), d(n, LL3)>.

A location estimation technique that only considers distance to the global landmarks GL1 and GL2 may conclude that nodes 10 and 20 are in close proximity in the network 100, because the nodes 10 and 20 have similar distances to the global landmark nodes GL1 and GL2. These types of inaccuracies are known as false clustering. By accounting for the distances to the local landmark nodes LL1-LL4, false clustering is minimized and a more accurate estimation of the location of the nodes 10 and 20 is determined.

The network 100 may include many local landmark nodes and global landmark nodes, not shown. The number of nodes selected to be local landmark nodes and global landmark nodes is generally much smaller than the total number of nodes in the network. Also, the total number of global landmark nodes in the network 100 is generally smaller than the number of local landmark nodes. The number of global and local landmark nodes used in the network 100 may depend on the desired accuracy of the location information. Simulations have shown that a relatively small number of global landmarks are needed, for example, 15 global landmark nodes for a network of 10,000 nodes, to generate accurate location information. Almost any node in the network 100 may be chosen to be a global landmark node or a local landmark node. For example, a predetermined number of nodes in the network may be randomly selected to be global landmark nodes and local landmark nodes, whereby the number of global landmark nodes is smaller than the number of local landmark nodes. To minimize network traffic local landmark nodes may be strategically placed in the network 100, such as near gateway routers. For example, nodes near gateway routers may be selected to be local landmark nodes.

As described above, the nodes 10 and 20 measure distance to local landmark nodes proximally located to the nodes 10 and 20. In one embodiment, local landmark nodes are proximally located to a node if the local landmark nodes are on a routing path to a global node. For example, node 10 transmits a probe packet to the global landmark node GL 1. The probe packet encounters local landmark node LL1, because it is on the routing path R1 to the global landmark node GL1. The local landmark node LL1 transmits and acknowledge (ACK) message back to the node 10. The node 10 determines distance to the local landmark node LL1, for example, using the RTT of the probe packet and the ACK message. Also, to minimize network traffic, a probe packet may keep track of the number of local landmark nodes that it has encountered, for example, by updating a field in a packet header similar to a time-to-live field. If a local landmark node receives a probe packet that has already encountered a predetermined number of local landmark nodes, the local landmark node simply forwards the packet without transmitting an ACK message.

In another embodiment, each of the local landmark nodes measures its distance to global landmark nodes to obtain its own landmark vector. These landmark vectors are stored in a global information table that is stored in the nodes in the network 100. The global information table is queried to identify local landmark nodes in proximity to a node. For example, the node 10 queries the global information table to identify local landmark nodes, such as the local landmark nodes LL1 and LL4 in proximity with the node 10. This may include identifying local landmark nodes having landmark vectors with a predetermined similarity to the node 10, wherein the predetermined similarity is related to a distance threshold between the node and the landmark node. Then, the node 10 determines distance to the local landmark nodes LL1 and LL4. Thus, a local landmark node need not be in a routing path to a global landmark node to be considered proximally located to the node 10.

Each node in the network 100 may generate location information, such as landmark vectors, by determining distances to the global landmark nodes and proximally located local landmark nodes. Each node stores its location information in a global information table. Thus, the global information table may include landmark vectors for substantially all the nodes in the network.

According to an embodiment, the global information table is implemented using a distributed hash table (DHT) overlay network. DHT overlay networks are logical representations of an underlying physical network, such as the network 100, which provide, among other types of functionality, data placement, information retrieval, and routing. DHT overlay networks have several desirable properties, such as scalability, fault-tolerance, and low management cost. Some examples of DHT overlay networks that may be used in the embodiments of the invention include content-addressable-network (CAN), PASTRY, CHORD, and expressway routing CAN (eCAN), which is a hierarchical version of CAN. The eCAN overlay network is further described in U.S. patent application Ser. No. 10/231,184, entitled, "Expressway Routing Among Peers", filed on Aug. 29, 2002, having a common assignee as the present application, and is hereby incorporated by reference in its entirety.

A DHT overlay network provides a hash table abstraction that maps keys to values. For example, data is represented in an overlay network as a (key, value) pair, such as (K1,V1). K1 is deterministically mapped to a point P in the overlay network using a hash function, e.g., P=h(K1). An example of a hash function is checksum or a space filling curve when hashing to spaces of different dimensions. The key value pair (K1, V1) is then stored at the point P in the overlay network, i.e., at the node owning the zone where point P lies. The same hash function is used to retrieve data. The hash function is also used for retrieving data from the DHT overlay network. For example, the hash function is used to calculate the point P from K1. Then the data is retrieved from the point P.

In one example, the global information table is stored in a CAN overlay network, however other types of DHT overlay networks may be used. In this example, a landmark vector or a portion of the landmark vector for a node is used as a key to identify a location in the DHT overlay network for storing information about the node. By using the landmark vector as a key, information about nodes physically close to each other in the underlying physical network are stored close to each other in the DHT overlay network, resulting in a minimal amount of traffic being generated when identifying a set of nodes close to a given node in the network.

Figure 2:
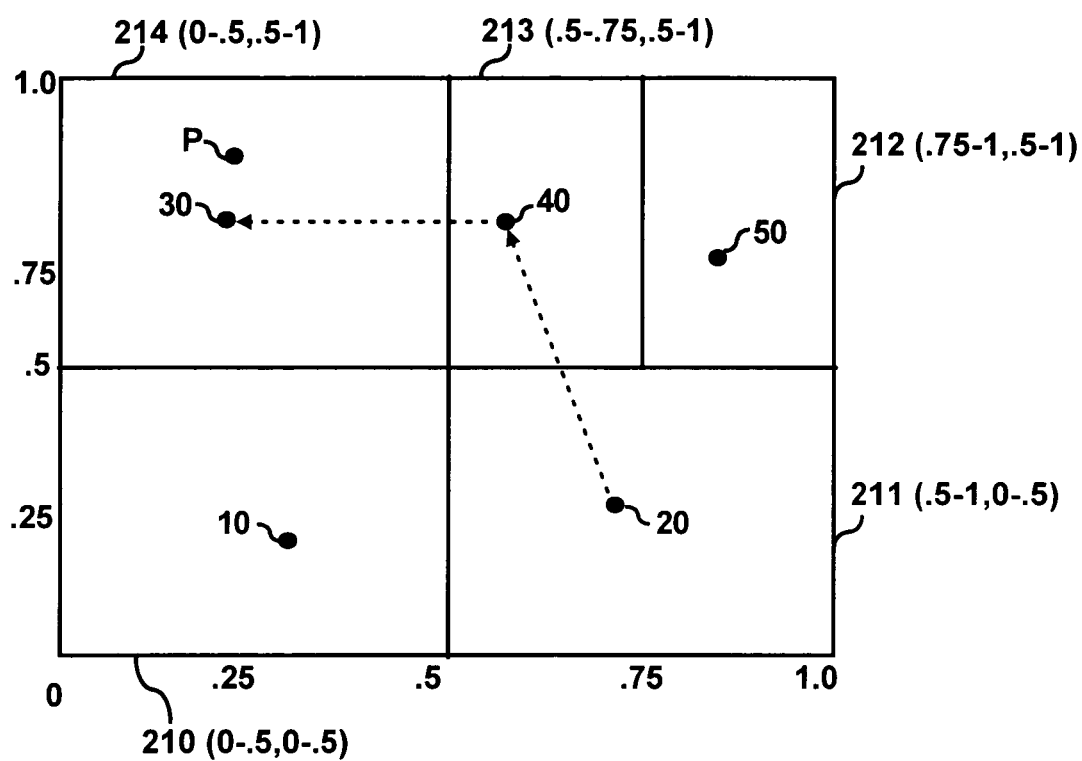
FIG. 2 illustrates a 2-dimensional CAN overlay network for the network shown in FIG. 1, according to an embodiment.

FIG. 2 illustrates an example of a 2-dimensional CAN overlay network 200 shown in FIG. 2, which is a logical representation of the underlying physical network 100. The nodes 30-50 shown in FIG. 2 are not shown in the network 100 shown in FIG. 1, but the nodes 30-50 may also be in the network 100. A CAN overlay network logically represents the underlying physical network using a d-dimensional Cartesian coordinate space on a d-torus. FIG. 2 illustrates a 2-dimensional [0,1]×[0,1] Cartesian coordinate space in the overlay network 200. The coordinates for the zones 210-214 are shown. The Cartesian space is partitioned into CAN zones 210-214 owned by nodes 10-50, respectively. Each DHT node in the overlay network owns a zone. The nodes 30 and 20 are neighbor nodes to the node 10 and the nodes 40-50 and 10 are neighbor nodes to the node 20. Two nodes are neighbors if their zones overlap along d−1 dimensions and abut along one dimension. For example, the zones 210 and 214 abut along [0, 0.5]×[0.5, 0]. The zones 210 and 213 are not neighbor zones because these zones do not abut along a dimension.

The nodes 10-50 each maintain a coordinate routing table that may include the IP address and the zone coordinates in the overlay network of each of its immediate neighbors. The routing table is used for routing from a source node to a destination node through neighboring nodes in the DHT overlay network 200. Assume the node 20 is retrieving data from a point P in the zone 214 owned by the node 30. Because the point P is not in the zone 211 or any of the neighboring zones of the zone 211, the request for data is routed through a neighboring zone, such as the zone 213 owned by the node 40 to the node 30 owning the zone 214 where point P lies to retrieve the data. Thus, a CAN message includes destination coordinates, such as the coordinates for the point P determined using the hash function, for routing.

Figure 3:
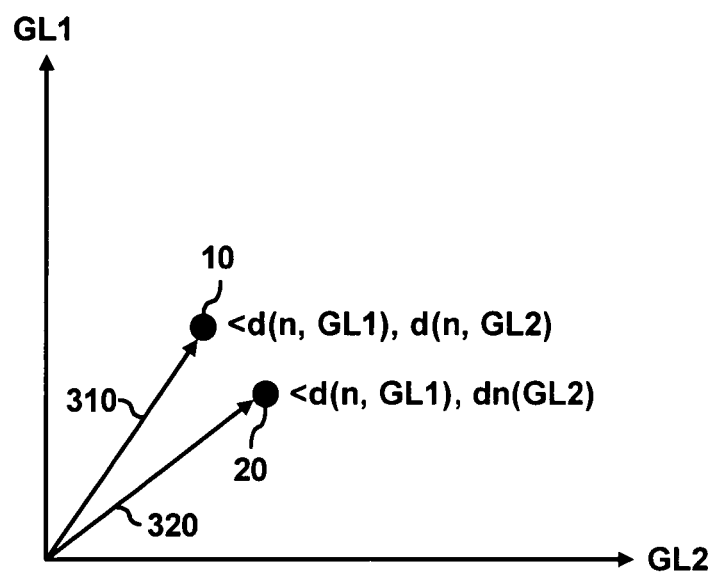
FIG. 3 illustrates a landmark space including landmark vectors, according to an embodiment.

The global information table includes information about the nodes in the network 100, and the information is stored in the nodes in the DHT overlay network 200. To store information about a node in the global information table, the landmark vector for the node, which includes distances to the global landmark nodes in the network and distances to proximally located local landmark nodes, is used as a key to identify a location in the DHT overlay network for storing information about the node. By using the landmark vector or a portion of the landmark vector, such as the distances to the global landmark nodes, as a key, information about nodes physically close to each other in the network are stored close to each other in the DHT overlay network. FIG. 3 illustrates a landmark space 300 including landmark vectors 310 and 320 for the nodes 10 and 20. The landmark space 300 is a logical representation of a space for mapping the landmark vectors of the nodes in the network 100. The landmark space 300 is being shown to illustrate the mapping of the landmark vectors to locations in the DHT overlay network 200 for storing information in the global information table.

The global landmark portions of the landmark vectors for the nodes 10 and 20 are used to identify points in the landmark space 300 that are mapped to the DHT overlay network 100 for storing information in the global information table. The global landmark portion for the nodes 10 is <d(n, GL1), d(n, GL2))>, where d is distance to the global landmark nodes and n is the node 10 or 20. Each node in the network 100 may be mapped to the landmark space using the global landmark portion of the respective landmark vector. Also, the landmark space 300 may be much greater than two dimensions. The number of dimensions may be equal to the number of global landmark nodes used in the network 100. The nodes 10 and 20 are positioned in the landmark space 300 at coordinates based on their landmark vectors. Thus, nodes close to each other in the landmark space 300 are close in the physical network 100.

Figure 4:
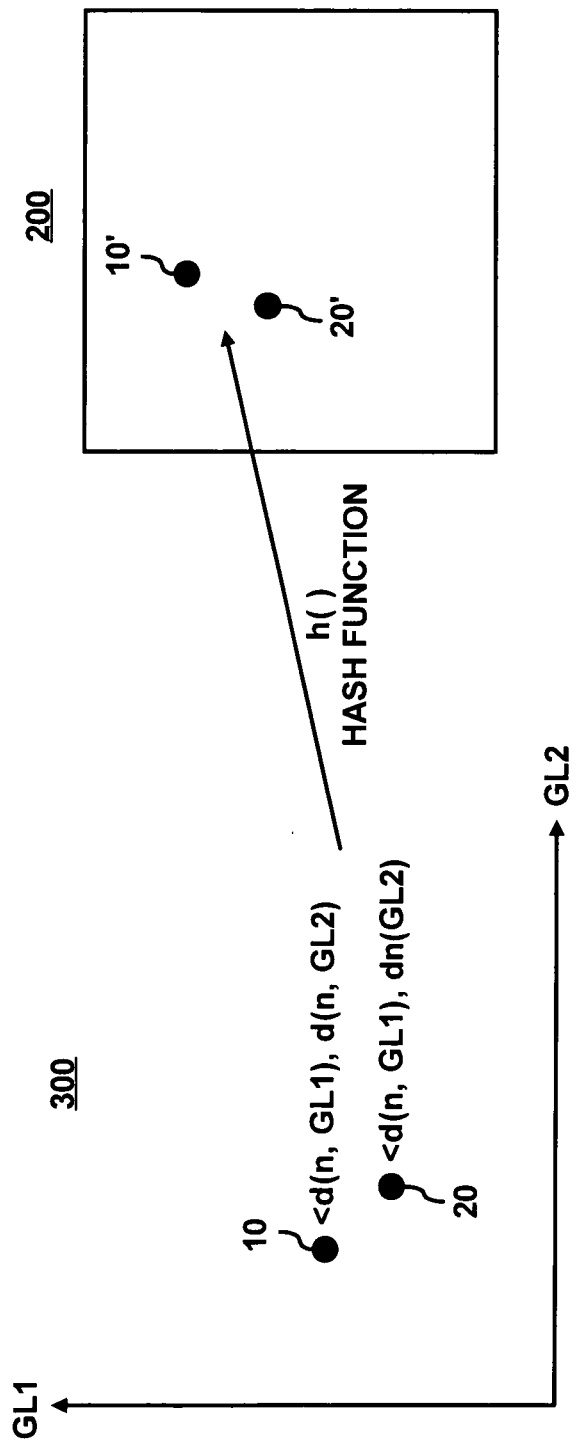
FIG. 4 illustrates using a hash function to translate points in the landmark space shown in FIG. 3 to an overlay network, such as shown in FIG. 2, according to an embodiment.

A hash function is used to translate physical node location information (e.g., landmark vectors) from the landmark space 300 to the overlay network 200, such that points close in the landmark space 300 are mapped to points that are close in the DHT overlay network 200. FIG. 4 illustrates using a hash function to translate the points for the nodes 10 and 20 in the landmark space 300 to the overlay network 200. The hash function is used to determine the points 10' and 20' in the overlay network 200 that correspond to the points in the landmark space 300 for the nodes 10 and 20. The information for the nodes 10 and 20 is stored in the nodes that own the zone where the points 10' and 20' are located. Thus, by hashing the global landmark portion of a landmark vector, a node in the overlay network 200 is identified for storing information in the global information table, such as the complete landmark vector and other information associated with the nodes. Thus, the global information table is stored among the nodes in the DHT overlay network 200. Using a DHT overlay network to store landmark vectors is further described in U.S. patent application Ser. No. 10/666,621, entitled "Utilizing Proximity Information in an Overlay Network" by Tang et al., having a common assignee with the present application, which is hereby incorporated by reference in its entirety.

In certain instances, the number of dimensions of the landmark space may be larger than the number of dimensions of the overlay network. A hash function comprising a space filling curve may be used to map points from the larger dimension space to the smaller dimension space, which is also described in the aforementioned patent application, U.S. patent application Ser. No. 10/666,621, incorporated by reference.

Figure 5:
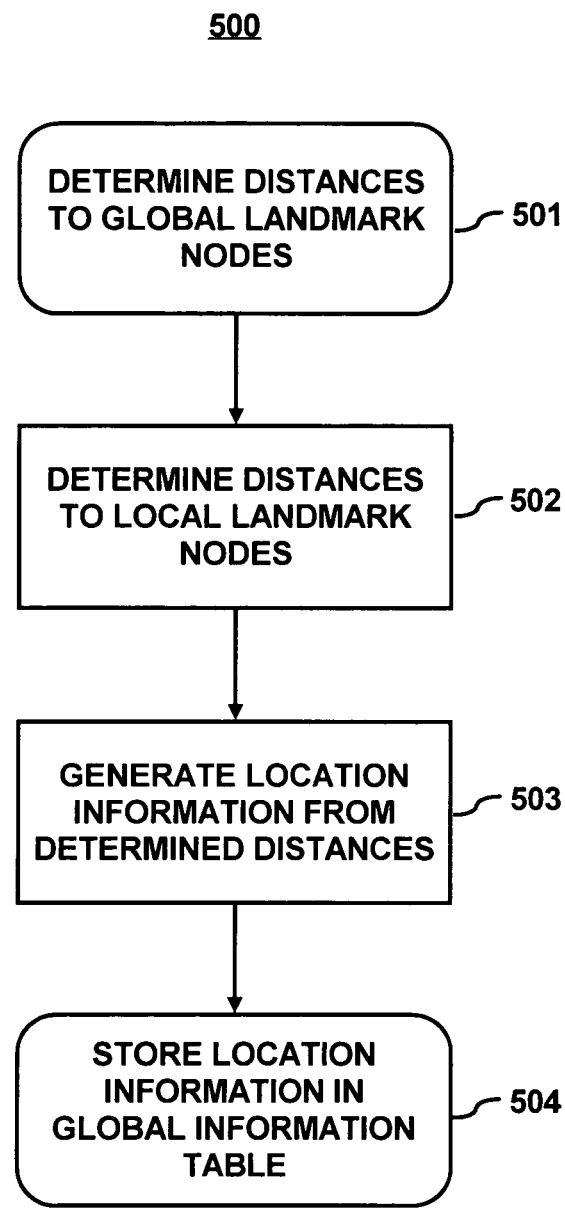
FIG. 5 illustrates a flow chart of a method for determining location information for a node in a network, according to an embodiment.

FIG. 5 illustrates a flow chart of a method for determining location information for nodes, according to an embodiment. FIG. 5 is described with respect to the network 100 shown in FIG. 1 and the overlay network 200 shown in FIG. 2 by way of example and not limitation. At step 501, the node 10 determines distances to the global landmark nodes in the network 100. For example, the node 10 measures distances to the global landmark nodes GL1 and GL2 using RTT or another network metric.

At step 502, the node 10 determines distances to local landmark nodes in proximity to the node 10. This may include the local landmark nodes LL1 and LL4 encountered by a probe packet measuring RTTs to the global landmark nodes GL1 and GL2. In another example, distances to all local landmark nodes within a predetermined distance to the node are determined using the global information table. This may be determined by comparing landmark vectors for nodes. Nodes with landmark vectors having a predetermined similarity are selected from the global information table.

Steps 501 and 502 may be performed together. For example, when the local landmark nodes reside on the routing path, probing the global landmark node gets the distances to the corresponding local landmarks with substantially no messaging overhead. For example, substantially all the routers in the network may be selected as local landmark nodes and traceroute or another similar network utility is used to obtain the distances to global and local landmark nodes. In this example, distance to every router in a routing path between a node and a global landmark node may not be measured. For example, a time-to-live field may be utilized, such that distances to only the first predetermined number of routers receiving the probe packet are measured. Alternatively, distances to, for example, the $1^{st}$, $2^{nd}$, $4^{th}$, $8^{th}$, and $16^{th}$ routers are measured. Thus, distances to a number of routers less than the total number of routers on a routing path to a global landmark node may be measured.

At step 503, location information for the node 10 is generated using the distances to the global landmark nodes and the local landmark nodes. For example, a landmark vector is generated for the node 10 including the distances to the global landmark nodes GL1 and GL2 and the distances to the local landmark nodes LL1 and LL4.

At step 504, the node 10 stores its location information, such as its landmark vector, in the global information table. In one example, this includes hashing the global landmark portion of the landmark vector to identify a location in the DHT overlay network 200, shown in FIG. 2, for storing the location information and possibly other information about the node 10. The other information may include information about network metrics associated with the node, such as, forwarding capacity, etc. Also, if the node is providing content or services, that information may be stored in the global information table.

Figure 6:
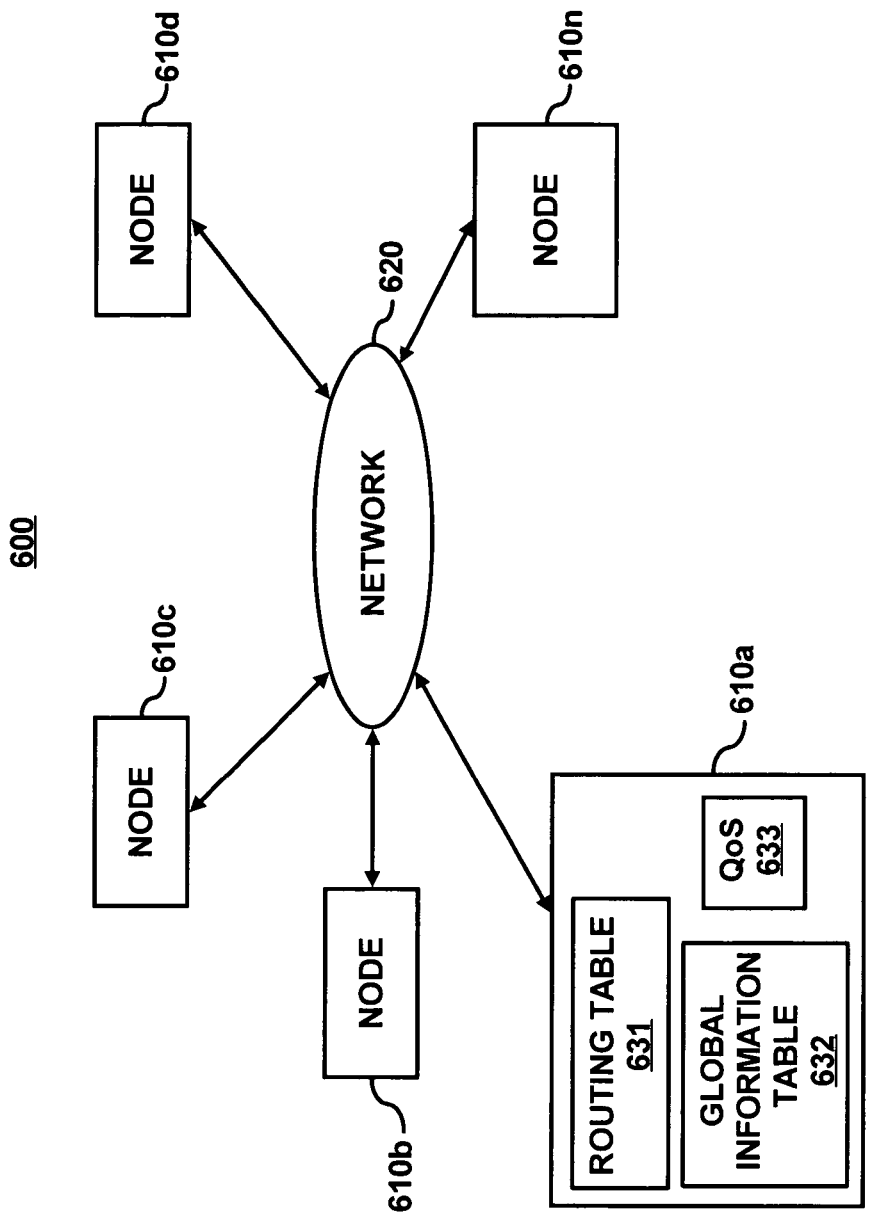
FIG. 6 illustrates a peer-to-peer system, according to an embodiment.

FIG. 6 illustrates a peer-to-peer (P2P) communications model that may be used by the underlying physical network, such as the networks 100 and 500 shown in FIGS. 1 and 5, according to an embodiment of the invention. P2P networks are commonly used as the underlying physical network for DHT overlay networks, such as the CAN DHT overlay network 200 shown in FIG. 2. A P2P network 600 includes a plurality of nodes 610a ... 610n functioning as peers in a P2P system. The nodes 610a ... 610n exchange information among themselves and with other network nodes over a network 620. The nodes 610a ... 610n may also determine which nodes 610a ... 610n perform other functions of a peer in a P2P system, such as object search and retrieval, object placement, storing and maintaining the global information table. Objects may include files, URLs, etc. The nodes 610a ... 610n may be computer systems (e.g., personal digital assistants, laptop computers, workstations, servers, and other similar devices) that have a network interface. The nodes 610a ... 610n may be further operable to execute one or more software applications (not shown) that include the capability to share information (e.g., data, applications, etc.) in a P2P manner and the capability to operate as nodes in a DHT overlay network. Not every node in the network 600 may be a DHT node (e.g., a node owning a zone in the DHT overlay network), but substantially every node in the network 600 may store information in the global information table implemented in the DHT overlay network.

The network 620 may be operable to provide a communication channel among the nodes 610a ... 610n. The network 620 may be implemented as a local area network, wide area network or combination thereof. The network 620 may implement wired protocols, such as Ethernet, token ring, etc., wireless protocols, such as Cellular Digital Packet Data, Mobitex, IEEE 802.11b, Bluetooth, Wireless Application Protocol, Global System for Mobiles, etc., or combination thereof.

Some of the information that may be stored in the nodes 610a ... n is shown for node 610a. The node 610a stores a routing table 631, the global information table 632, and possibly measured network metrics associated with node, shown as QoS characteristics 633.

Figure 7:
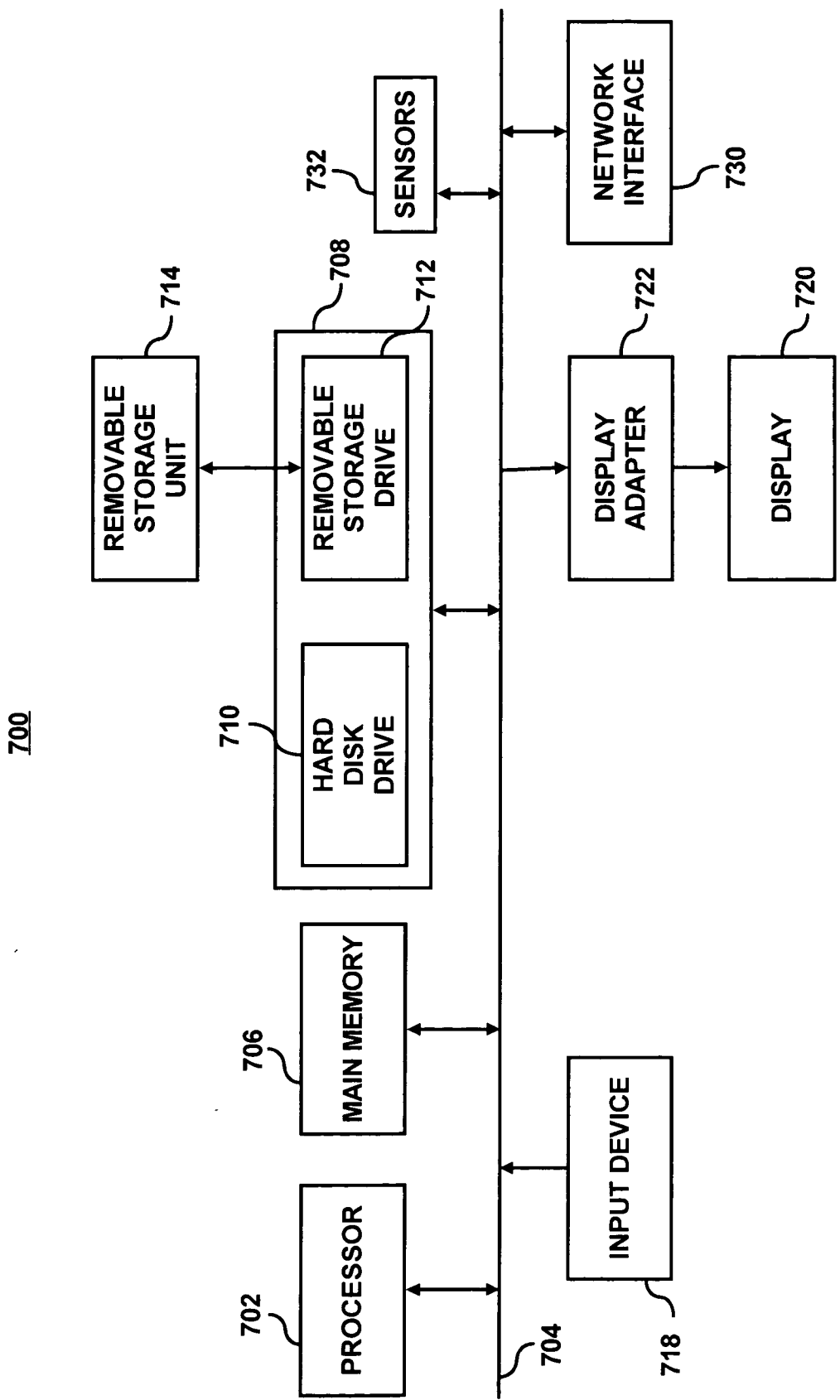
FIG. 7 illustrates a computer system that may operate as a node in the peer-to-peer system shown in FIG. 6, according to an embodiment.
Figure 8:
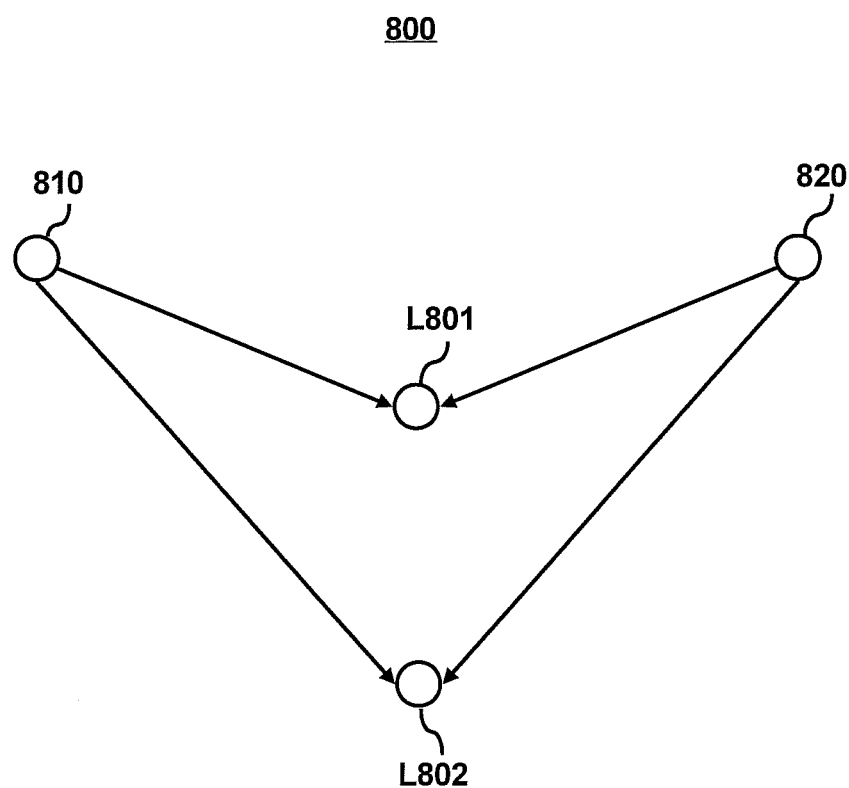
FIG. 8 illustrates a conventional landmark clustering scheme.

FIG. 7 illustrates an exemplary block diagram of a computer system 700 that may be used as a node in the P2P network 600 shown in FIG. 6. The computer system 700 includes one or more processors, such as processor 702, providing an execution platform for executing software.

Commands and data from the processor 702 are communicated over a communication bus 704. The computer system 700 also includes a main memory 706, such as a Random Access Memory (RAM), where software may be executed during runtime, and a secondary memory 708. The secondary memory 708 includes, for example, a hard disk drive 710 and/or a removable storage drive 712, representing a floppy diskette drive, a magnetic tape drive, a compact disk drive, etc., or a nonvolatile memory where a copy of the software may be stored. The secondary memory 708 may also include ROM (read only memory), EPROM (erasable, programmable ROM), EEPROM (electrically erasable, programmable ROM). In addition to software, routing tables, the global information table, and measured network metrics associated with the node, such as QoS characteristics including load, forwarding capacity, bandwidth, etc., may be stored in the main memory 706 and/or the secondary memory 708. The removable storage drive 712 reads from and/or writes to a removable storage unit 714 in a well-known manner.

A user interfaces with the computer system 700 with one or more input devices 708, such as a keyboard, a mouse, a stylus, and the like. The display adaptor 722 interfaces with the communication bus 704 and the display 720 and receives display data from the processor 702 and converts the display data into display commands for the display 720. A network interface 730 is provided for communicating with other nodes via the network 620 shown in FIG. 6. Also, sensors 732 are provided for measuring QoS characteristics for the node, which may include forward capacity, load, bandwidth, etc.

One or more of the steps of the method 500 may be implemented as software embedded on a computer readable medium, such as the memory 706 and/or 708, and executed on the computer system 700. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form.

Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

Some example of the steps that may be performed by the software may include steps for determining distances to generate location information. For example, the software instructs the processor 702 to use other hardware for generating probe packets for measuring RTT to global landmark nodes to determine distance. In another example, the software may generate a request to the global information table for identifying local landmark nodes within a predetermined proximity and measure distances to those local landmark nodes. The software includes instructions for implementing the DHT overlay network and for storing information to the global information table in the DHT overlay network by hashing a landmark vector.

It will be readily apparent to one of ordinary skill in the art that other steps described herein may be performed by the software. For example, if the computer system 700 is selected as a local landmark node, the computer system 700 may respond to received probe packets by generating an ACK message transmitted back to a node. Thus, the node transmitting the probe packet is able to determine distances to proximally located landmark nodes.

While the invention has been described with reference to the exemplary embodiments thereof, those skilled in the art will be able to make various modifications to the described embodiments without departing from the true spirit and scope. For example, it will be apparent to one of ordinary skill in the art that the advantages of storing location information as described herein can be applied to many applications, such as information storage, load balancing, congestion control, meeting quality of service (QoS) guarantee, taking advantage of heterogeneity in storage capacity and forwarding capacity, etc. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of determining location information for a computer system node in a network, the method comprising:

determining, by a processor, first distances along routing paths from the node to global landmark nodes;

identifying local landmark nodes located in the routing paths between the node and the global landmark nodes;

determining, by the processor, second distances from the node to the identified local landmark nodes; and determining location information for the node based on the first distances and the second distances.

2. The method of claim 1, wherein determining location information comprises determining location information associated with a physical location of the node in the network based on the first distances and the second distances.

3. The method of claim 1, wherein determining location information comprises generating a landmark vector including the first distances and the second distances.

4. The method of claim 3, further comprising transmitting the landmark vector to at least one other node in the network storing landmark vectors for a plurality of nodes in the network.

5. The method of claim 3, further comprising:
hashing at least a portion of the landmark vector to identify a location in an overlay network for storing the landmark vector, wherein the overlay network is a logical representation of the network; and
transmitting the landmark vector to a node at the identified location to store the landmark vector.

6. The method of claim 1, wherein determining first distances from the node to the global landmark nodes comprises:
transmitting a probe packet to each global landmark node; and
measuring round-trip-time to each global landmark node using the transmitted probe packet.

7. The method of claim 6, wherein determining second distances from the node to the local landmark nodes comprises:
receiving an acknowledge message from each local landmark node receiving the probe packet; and
determining the second distances to the local landmark nodes in response to receiving each acknowledge message.

8. The method of claim 1, further comprising:
querying a global information table that stores location information of nodes in the network to select a plurality of the local landmark nodes within a predetermined distance from the node; and
determining distances to each of the plurality of local landmark nodes.

9. The method of claim 1, further comprising selecting a predetermined number of nodes in the network to be global landmark nodes and local landmark nodes based on the number of nodes in the network.

10. The method of claim 9, wherein selecting a predetermined number of nodes in the network to be global landmark nodes comprises randomly selecting a predetermined number of nodes in the network to be global landmark nodes.

11. The method of claim 9, wherein selecting a predetermined number of nodes in the network to be local landmark nodes comprises randomly selecting a predetermined number of nodes in the network to be local landmark nodes.

12. The method of claim 9, wherein selecting a predetermined number of nodes in the network to be local landmark nodes comprises:
identifying nodes located near at least one gateway router or including the at least one gateway router in the network; and
selecting at least one of the identified nodes to be a local landmark node.

13. The method of claim 9, wherein a number of global landmark nodes in the network is less than a number of local landmark nodes in the network.

14. The method of claim 1, wherein determining first distances comprises determining distances to all of the global landmark nodes in the network.

15. The method of claim 1, wherein at least one of the local landmark nodes is a router.

16. A computer system node in a network comprising:
a processor; and
a memory storing computer readable instructions executable by the processor to:
determine first distances along routing paths from the node to global landmark nodes;
identify local landmark nodes located in the routing paths between the node and the global landmark nodes;
determine second distances from the node to the identified local landmark nodes; and
determine location information for the node based on the first distances and the second distances.

17. The computer system node of claim 16, wherein the computer readable instructions are further executable by the processor to:
identify a location in an overlay network for storing the location information, wherein the overlay network is a logical representation of the network; and
transmit the location information to a node at the identified location to store the location information.

18. A computer system operable to connect to a peer-to-peer network, the computer system comprising:
a processor to determine a physical location of the computer system in the peer-to-peer network by determining first distances along routing paths from the computer system to global landmark nodes, identifying local landmark nodes located in the routing paths between the node and the global landmark nodes, determining second distances from the computer system to the identified local landmark nodes, and determining the physical location of the computer system based on the first distances and the second distances; and
a memory to store location information associated with the physical location of the computer system.

19. The computer system of claim 18, wherein the memory is to store location information for a plurality of nodes in the peer-to-peer network that are physically close to the computer system.

20. The computer system of claim 18, wherein the processor is to identify a location in an overlay network for storing the location information, wherein the overlay network is a logical representation of the peer-to-peer network.

21. The computer system of claim 20, further comprising a network interface to connect the computer system to the peer-to-peer network, wherein the computer system is to transmit the location information to the identified location in the overlay network via the network interface.

22. A non-transitory computer readable storage medium storing machine readable instructions executable by at least one processor to:
determine first distances along routing paths from the node to global landmark nodes;
identify local landmark nodes located in the routing paths between the node and the global landmark nodes;
determine second distances from the node to the identified local landmark nodes; and
determine location information for the node based on the first distances and the second distances.

23. The non-transitory computer readable storage medium of claim 22, wherein the machine readable instructions are further executable by the at least one processor to:

identify a location in an overlay network to store the location information, wherein the overlay network is a logical representation of the network.

24. The non-transitory computer readable storage medium of claim 22, wherein the machine readable instructions to identify a location in an overlay network comprise instructions to hash the location information to identify a location in the overlay network to store the location information.

25. The non-transitory computer readable storage medium of claim 22, wherein the local landmark nodes are located within a predetermined distance from the node.

* * * * *